Patented July 14, 1931

1,814,132

UNITED STATES PATENT OFFICE

RICHARD GURLEY DREW, OF ST. PAUL, MINNESOTA, ASSIGNOR TO MINNESOTA MINING & MANUFACTURING COMPANY, OF ST. PAUL, MINNESOTA, A CORPORATION OF DELAWARE

PROCESS FOR PREPARING ADHESIVE TAPE

No Drawing. Original application filed May 28, 1928, Serial No. 281,104, now Patent No. 1,760,820. Divided and this application filed May 24, 1930. Serial No. 455,440½.

My invention relates in general to adhesives, adhesive compositions or adhesive sheets or coatings; more particularly to pressure energizable adhesives, adhesive sheets or coatings, preferably water insoluble and normally non-drying.

My invention is a division of my prior application, S. N. 281,104, filed May 28, 1928, now Patent No. 1,760,820 for adhesive tape.

While my invention has a broad field of usefulness, I have found it of peculiar utility for producing an adhesive coating for limiting the application of the spray of liquid finishing material, such as, for example, lacquers or painting materials used in operations in automobile body paint shops and therefore find it convenient to describe the invention in connection with such practice and product, it being understood, however, that such fields of specific description are employed purely for purposes of illustration of an example of the utility of this invention in its several phases, besides other novel phases as may appear or be hereinafter pointed out.

In the work referred to specifically above, my improved material may be used directly as a coating or as an adhesive material for holding protective paper aprons or masks against surfaces on which it is not desired to apply a lacquer, paint, paint spray or lacquer spray, such as, for example, glass windows, upholstery, rubber mats, running boards, bright metal parts and wrapping material in general, and the like.

My product may also be applied to a surface which, in a subsequent step, is to be finished by an application of a lacquer spray or painting or to a surface which has been finished in order to prevent mingling of the colors, as for example, in two color work. My improved material may be applied to paper or similar fabric material in sheeted form and is capable of being stored in piled sheets or in laminations, as formed by rolling layers of material, such as tape, or such other form as may be proper for the purpose contemplated.

For certain preferred work, for advantages hereinafter pointed out, my improved material may be applied to paper to impart minimum point contact and inherent elasticity by applying the same to paper which is toweled or crimped or otherwise shaped to present a surface other than flat and which has an extensibility beyond that of the flat paper web. Further, my improved material may be applied to completely or partially cover a backing material such as paper to present a surface which has minimum adhering surface, yet satisfies the requirements of a completely coated backing material.

It is to be observed that in finishing automobile bodies with lacquers, paints or the like of a plurality of colors, difficulty is found in limiting the application owing to the diffusion of the spray, where such is used, or requiring skillful application of the paint brush, when the latter is used. In order to obtain a clear and cleancut line of demarcation between several colors or within limited areas or applying a coating material within limited areas, masks or aprons in the form of adhesive tape have been used. These are of the general types comprising an insoluble zinc oxide adhesive coating and the rubber base adhesive coating as one group, both of which use a cloth backing, and the ordinary gummed paper tape, which forms an example of the other type. Both types of tape referred to present certain marked objections. As to the latter type, ordinary gum base tape is energized by wetting, objectionable in that it requires this wetting operation before application and still more objectionable in that it adheres so tenaciously that to remove the same requires softening of the adhesive material with large quantities of water for a long time and where this practice is resorted to the paper material becomes so weak as to laminate and tear and to effect removal, sometimes necessitating scraping, tending to mar the underlying surface.

In the case of cloth backing, adhesive coated material, a rather expensive item is involved in the use of the cloth backing but this material is still further objectionable for use for the purpose contemplated in that the woven fabric is distensible to an extent which will make its edges irregular and unsuitable for stripping. Furthermore, the cloth is permeable to the solvents normally used in connection with lacquer whereby the adhesive coating will be disengaged and be left as a residuum upon the body of the material.

And it is used in its preferred form to apply to an adhesive which is merely affixed by the pressure necessary in spreading a tape to a body material requiring no prior wetting or moistening to energize the adhesive.

While for simplicity in describing the invention and as an example for making the same, I have referred to a rubber base adhesive, it is understood that it is contemplated to employ a non-drying, pressure aggressive adhesive material and that this expression is used in the specification and claims in its broadest sense.

Among the objects of my invention are the provision of an adhesive or coating material which is non-drying or becomes aggressive by the application of pressure; the provision of an adhesive coating or coating material which becomes energizable by the application of pressure and without modification of the same by solvents or heat; the provision of an adhesive or coating material upon an inexpensive base, such as sheeted material of paper, the same being non-drying and energizable by the application of pressure without the use of solvents or heat; the provision in a sheeted material of an adhesive coating which is normally non-drying and pressure sensitive, but which is so formed as to contact with work upon which it is applied to have sufficient adhesiveness for its intended function of holding a sheeted material in position, but separable and removable without marring the work to which it is applied characterized by having greater cohesion inter se than to the body to which it is applied particularly, when applied to the body of an automobile or similar surface to hold a paper backing temporarily as a mask during a lacquering or spreading operation; the provision in a sheeted material of an adhesive which is pressure sensitive which permits the tape to be adhesively applied to a surface without necessitating a moistening or wetting of the adhesive to energize the same or the application of heat for this purpose and which permits the paper to be separated from the body to which it is applied without leaving a residuum of the adhesive upon the automobile body when its use is for this preferred purpose; the provision in an adhesive article such as an adhesive tape of an adhesive which is normally pressure sensitive and which when coated upon a fabric such as paper, particularly that treated with gylcerine, a glue gylcerine composition, a paper coated with a chlorinated rubber composition or a paper coated with a varnish such as a phenolic condensation product, the adhesive may remain in contact with paper treated as described throughout prolonged periods of storage without undue adhesion to these products and without modifying the adhesive character of the composition for its intended purpose of application merely by pressure.

The paper base may be any of the following, which I cite by way of example:

(a) Kraft paper, regular sulfate paper, straight 100% wood pulp;

(b) Sulfite paper containing a goodly portion of cotton stock, suitable sized and maintained soft by additions of small quantities of glycerine;

(c) A parchmentized paper;

(d) A paper base which is preferably absorbent, approaching blotting paper, calendered or uncalendered; preferably, however, this paper base is of the unsized, uncalendered variety and is pressed, molded or otherwise formed with rugosities or corrugations to have the appearance of toweled fabric, such as by crimping or creping the same.

Paper of the character above described may have directly applied to one surface thereof a water insoluble, non-drying adhesive, preferably energizable or active merely by the application of pressure, so-called a zinc oxide or rubber base adhesive for surgeon's or industrial tape. This adhesive material may be given as follows:

*Example A*

A rubber compound and tackiness augmenting agent in the form of a synthetic resin. Proportions suitable for ordinary temperate climates may comprise:—

10 lbs. of plasticized, first quality plantation rubber, such as clear crepe or smoked sheets.

2 lbs. of cumaron gum or resin.

½ lb. of zinc oxide pigment.

The cumaron gum or resin is preferably an artificial resinous material coming under the group name of cumaron and indene resins, which is the polymerization product of coal tar derivatives. The above ingredients are compounded on a rubber rolling mill to a plastic condition and then cut to desired body or consistency, using a rubber solvent such as benzol or a petroleum solvent, such as high test gasoline.

In lieu of a synthetic resin I may employ a low boiling point natural resin, e. g., Burgundy pitch or pine oil foots. Burgundy pitch is soluble in both alcohol and benzol.

*Example B*

2 lbs. of plantation rubber.

5 lbs. of Mexican or wild rubber, high in natural resin content.

1 lb. of zinc oxide pigment.

The ingredients above enumerated are compounded on a rubber mixing roll and then cut to the desired consistency in a rubber solvent, based upon the necessary viscosity for spreading this material. Ordinarily, in both examples A and B, the solvent is calculated by the number of pounds of solid compound in one gallon of solvent such as, for instance, 8 lbs. of solid or compounded material and 1 gallon of benzol, which is commonly referred to as an 8 pound cut. The variations in proportions of solvent added will depend upon the desired thickness of adhesive coating required in the residuum.

It will be understood that the examples above given are for purposes of getting the requisite adhesiveness in temperate climates. An increase in resinous material or wild rubber may be made for material to be used in colder climates and in warmer climates the resin component may be reduced.

The resinous component may also be varied in its characteristics in its reactions to solvents by choice of the resinous material. Thus, for purposes of removal of the adhesive from some body to which it may be applied, it may be made soluble to various organic solvents, either benzol, gasoline, acetone or alcohol. Thus, where it is desirable to make a surgeon's tape, which is soluble in alcohol, an alcohol soluble resin is added in the examples above cited. Such resin may be Burgundy pitch. This will permit alcohol to be used in removing a piece of adhesive tape from any surface, such as from the skin of a patient, by merely soaking the backing of the tape in alcohol. The rubber, in any event, merely acts as a vehicle for the resin and the character of the adhesive in its reaction to solvents will be dependent upon the character of the resin incorporated with the rubber.

The rubber resin compounds in their solvents may be spread upon the paper backing directly, utilizing a knife spreader to uniformly and equally distribute this material upon the base or backing. The solvent may thereafter be removed by evaporation, preferably without recovering the solvent and leaving the rubber mixture upon the paper backing.

Though I may directly apply the rubber in its solvent upon a paper backing, particularly of the character above indicated as kraft or white paper, it is preferred to preliminarily treat the paper with sizing coats, priming coats or separator coats.

Though, as above described, I may use the kraft paper, white paper or parchmentized paper directly for a base or backing for the rubber adhesive, it is preferred to treat one side of the paper with a rubber primer and the opposite side of the paper with a rubber finisher and then applying the rubber adhesive to the side of the paper first treated with the rubber primer, after first preferably treating the paper, especially where that hereinabove exemplified as A, B or D is used, with a glue-glycerine solution insolubilized and preferably flexibilized by the process herein described and more particularly referred to in my application, S. N. 182,893.

The rubber primer is preferably a very light solution of rubber, which will leave a very thin residue of rubber, preferably tacky and to render the adhesive coating more amenable to adhesion therewith. The rubber finisher is preferably a solution of rubber which will leave a modified rubber deposit, such as chlorinated rubber or vulcanized rubber, thus leaving a residuum of rubber which is non-tacky and non-adherent to the touch of the hand or when stacked or rolled, will be capable of ready separation from the adhesive face. Tape so made can be wound up in rolls without slip sheeting and unwound successfully.

An example of a rubber primer as above used is as follows:

100 parts by weight of milled plantation rubber.

7½ parts by weight of phenolsulphonic acid.

This combination is formed in sheets and subjected to an even temperature of 135 to 140 degrees centigrade for approximately six hours. The resulting product is flexible, and when dissolved in benzol forms an extremely liquid solution.

Untreated, smoked sheets, when cut in benzol, will form a very heavy, viscous and gelatinous solution.

Conversion of rubber into thermoplastic products, can also be accomplished by using other reagents, such as toluenesulphonyl chloride and toluenesulphonic acid.

An example of a rubber finisher as above referred to may be made as follows:

Plantation rubber dissolved in a suitable solvent, such as benzol, is placed in an agitator into which a small stream of chlorine gas is allowed to flow. The temperature is checked by artificial refrigeration, and the chlorine treatment continued until the rubber solution has become about 55% chlorine saturated. Beyond this point free chlorine escapes, which is not desirable.

It will be understood that I may, for certain purposes, substitute for the rubber finisher coat a treatment such as outlined in my application S. N. 182,893 and the means therein described for assuring separation between the back of one sheet and the adhesive surface on the opposite side of an adjacent layer.

In the practice of my invention utilizing parchmentized paper, the adhesive base may be applied directly thereto. It is preferred to treat the back with glycerine or a glue-glycerine mixture and the opposite side, before applying the rubber adhesive, with a rubber priming coat—still further, by substituting for the glue-glycerine back size a rubber finisher coat as in the example above described. The back of the parchmentized paper, whether including a back size or rubber finisher coat, or not, may be improved during its manufacture or subsequently by the addition thereto of a thin coating of glycerine.

Unsized kraft paper or the creped, toweled paper above referred to may be used directly for applying thereto to rubber adhesive, preferably first interposing the finishing coat on the back and the priming coat on the front before applying this adhesive coating. Preferably, where the paper is of the unsized, uncalendered variety, the fibres thereof may be strengthened by treatment with a glue-glycerine solution to completely bond the fibres and may be insolubilized or tanned and have the flexibility thereof augmented by the process described in my application S. N. 182,893. Paper so treated, particularly as a result of first saturating with glue-glycerine and treatment with formaldehyde, forms a splendid base for the rubber primer, it being understood that I may treat the paper with glycerine or glue-glycerine after first applying a rubber priming coat, in which case it forms a layer to seal the surface of the paper, preventing the glycerine or glue-glycerine from penetrating into the rubber primer, and thus weakening the adhesiveness of the rubber. The fibrous material of the paper is bonded against lamination and is highly flexible. Economy is also effected in the amount of glue and glycerine necessary for saturating the paper base. I find that where the back of the paper is so treated, the primer adheres more firmly thereto.

A paper base of the character above described may be treated with a glue base saturating solution or an insoluble solution. For this purpose, the paper base is first sized with a solution of a polyhydric resin, a synthetic resinous material resulting from the reaction, condensation or polymerization of polyhydric alcohols or their anhydrides or similar compounds or polyhydric acids or their anhydrides. This center sizing material for the paper base may have its flexibility suitably augmented and upon evaporation of the vehicle there may be applied the rubber adhesive layer, preferably by first treating one side with a rubber primer and back sized with a rubber finisher of the character hereinabove referred to.

For making a paper base or backing, the paper is first submitted to a preliminary treatment by a saturating solution involving a glue base. The saturating solution of the following materials in proportions represent my preferred practice;—

36 pounds of dry glue
72 pounds of water
108 pounds (approx. 16° Twaddell) glue solution. Complete swelling is permitted, assisted by warming.

To this is then added 108 pounds of yellow glycerine.

108 pounds (approx. 16° Twaddell) glue solution
108 pounds pale yellow glycerine
216 pounds glue-glycerine water solution.

To this is added 216 pounds of water.
216 pounds glue-glycerine water solution
216 pounds water
432 pounds.

The paper above described is preferably continuously submerged and passed through a bath of the saturating solution as above prepared and then passed through pressure rolls to squeeze off the excess and then dried by heating. It will be observed that just complete saturation is preferred as this step is closely related to the success or failure of the treatment. An insufficient saturation will be characterized by failure to completely bond the fibres of the unsized paper nor will the saturating solution be present on the back side. An oversufficient saturation of the paper will render the surface unfit for subsequent coating, which will be observed as this description proceeds.

A paper so treated will be found to have the fibres thereof locked to materially strengthen the paper web and provide a highly flexible sheet. Where I use the toweled or creped variety of paper, this sheet will be found to be substantially elastic and resistant to tearing by shock, as where using the same for wrapping purposes.

Prior to the drying step above mentioned, in one form of the practice of my invention, after the paper has been saturated and passed through the pressure rolls, the web of material is subjected to a treatment tending to insolubilize or tan the glue. The insolubilizing or tanning agents may be formaldehyde in solution or as a vapor, sodium carbonate solution of gallic and tannic acids, chromium trioxide and chrome alum or other chrome and aluminum salts.

My preferred practice is to submerge the paper in a bath consisting of one part commercial formaldehyde and nine parts water by volume. The lapse of time between saturating with glue-glycerine water solution and formaldehyde does not seem to materially affect the quality of the paper. Formaldehyding on one side only, that is, the application of formaldehyde to one face of the previously treated paper, is preferred for purposes which will hereinafter appear where it is desired to further coat the untreated surface and leave the opposite surface substantially inactive.

The formaldehyding on one face only has the advantage that immediate insolubilizing or tanning may be practiced and further, treating one side only is less strain on a paper than complete submersion, particularly where the formaldehyde is in the form of a solution and the saturated paper before the excess water is evaporated is of low tensile strength and therefore less subject to tear or break. The treated surface is then submitted to a neutralizing action and where formaldehyde is used for the insolubilizing or tanning action, I may accomplish neutralization by subjecting the paper to a lime water treatment. It is preferred, however, to submit the formaldehyded web to a heat treatment. A temperature of 140 to 160° F. is used to thoroughly dry and volatilize all surplus formaldehyde.

It will be observed that I have described the saturation and the insolubilizing or tanning of the glue base as separate steps. However, the tanning or insolubilizing agent may be incorporated in the saturating solution above described, the tanning action or insolubilizing action of the glue being accomplished simultaneously with the drying of the saturating solution. For this purpose there is added to the saturating solution the tanning or insolubilizing agent. Where I use formaldehyde, I put an aldehyde compound into the glue solution prior to the saturation step. It is preferred to retard the action of the aldehyde so that the insolubilizing or tanning of the glue is accomplished in the drying step. This retarding activity is accomplished by taking any aldehyde compound, such as formaldehyde, and adding ammonia thereto. In practice, equal molecular percentages of formaldehyde and ammonia are used in amounts equivalent to 5% of the aldehyde to the dry weight of the glue.

The saturating solution thus modified is used in the manner previously described. In the drying of the paper, the aldehyde-ammonia compound breaks down to liberate formaldehyde, setting up, insolubilizing or tanning the glue.

Though mere exposure by air drying of the saturated paper will sufficiently insolubilize the glue, due to the decomposition of the ammonia-formaldehyde compound, to liberate formaldehyde, however, it is preferred to hasten this decomposition by heating the saturated web. Ordinarily a temperature of approximately 80° C. will be sufficiently rapid. However, it is preferred to use a temperature between 100 to 120° C., which has been found to sufficiently set the glue with a speed of operation conducive to best practice.

Where I have described the use of dry glue with pale yellow glycerine, it will be observed that good results have been obtained with cheaper material such as low grade glue and using the crude rather than the pale yellow glycerine. Other flexibility augmenting agents as a modifier for the glue in place of the glycerine may be used. For certain purposes, particularly as will hereinafter be described, sulphonated oils such as Turkey red oil, sulphonated castor oil, may be used. These materials are not hygroscopic and tend to check, to a certain extent, the tendency to absorb and carry too much water. While I may use hygroscopic agents in general, for modifying the glue to retain a certain amount of water content inducing flexibility, it is preferred to use organic modifiers and for this purpose a sugar content fused in the glycerine of the saturating liquid has been found to be particularly desirable. A paper web saturated with glue, formaldehyded or tanned as above described, has been found to be waterproof and particularly suitable as a base for forming the adhesive tape previously described when there is coated thereover the pressure aggresive, non-drying rubber base adhesive previously described.

By "normally pressure sensitive adhesive" I mean to include a coating which normally is adhesive by pressure, as in applying a tape to a body material in which adhesion is effected without the necessity of energizing the adhesive by a moistening agent.

By a "unified cellulosic backing" I mean to include a web of fabric comprising paper chosen from the materials herein described including gelatinized cellulosic sheets, such as parchmentized paper, preferably treated with glycerine; paper treated with a composition consisting of glue, preferably modified by a softening agent, such as glycerine; paper surfaced with an insoluble rubber, such as chlorinated rubber; paper surfaced with an insoluble varnish compound, such as an insoluble resinous condensation product, the products whereof have the materials of the sheet in a condition so that when coated with a normally pressure sensitive adhesive, the elements of the sheet will be protected and held together against separation and with greater adhesion inter se than the adhesive coating has for the materials to which the adhesive coating is affixed, to permit removal of the sheet from work to which it is applied or from rolls or stacks of such sheets, without substantial splitting or lamination of the sheet.

By a "unified pressure sensitive adhesive" I mean to include a coating which is normally adhesive by pressure as in applying a tape to a body material in which adhesion is effected without the necessity of energizing the adhesive by a moistening agent, and which has greater adhesion to the backing to which it is applied and cohesion inter se than adhesion to the surface to which it is temporarily applied, to permit its use for the purposes herein outlined, without substantial breaking, separation or lamination.

The specially treated paper and its adhesive coating duplicate results attainable heretofore only with cloth backing and, in addition, has marked advantages thereover. The paper base adhesive tape—

(1) Produces a flexible sheet with more body and density than cloth, particularly where a creped or toweled paper is used;

(2) High tensile strength is obtained by loading the paper with glue, particularly when acted upon by an insolubilizing, tanning or formaldehyding agent. This renders the glue incapable of dissolving in water, which permits it to retain a considerable amount of its strength when in contact with water and hygroscopic materials which may constitute the adhesive film. When glycerine or other modifying elements are used, the saturated sheet is particularly flexible and resistant to breaking thereof by bending;

(3) The saturating and coating accomplish an action of welding, vulcanizing or gluing together of the paper fibres into one solid sheet, which makes impossible any laminating or splitting of the tape when removed from a surface to which it has been applied for some time or when put up in rolls without the use of slip sheeting;

(4) The treatment, particularly the saturating treatment of the paper, particularly when accompanied by insolubilizing, tanning or formaldehyding, also makes impossible any surface fibres breaking away or tearing away from the backing and sticking to the adhesive film when unwound from a roll. Thus, no modification of the adhesive film is effected.

(5) The hygroscopic agent, such as glycerine, retained in the saturated paper, maintains a water content in the paper backing of which it is a part. The adhesive film is therefore prevented from anchoring itself too securely to the reverse side of the backing, that is, a non-drying adhesive secures a hold or adheres to a dry surface much more thoroughly than to one which is moist or damp. Also, as the blue saturated paper has been insolubilized, tanned or formaldehyded, the adhesive coating will not unite with the backing as there is no solution possible between the rubber base adhesive and an insolubilized gelatin.

(6) The paper affords a material cheaper than cloth, which will not stretch as cloth does and, in a painting operation, which enables the user to preserve the same for stripping and the like painting or finishing operations. The paper base or backing being relatively thin, permits sharper definition in a painting operation for two tone color jobs as it lies substantially in the plane of the body to which it is affixed. Furthermore, the edge of a paper backed adhesive tape presents no feather edge nor will it unravel as cloth backing will, making it additionally desirable in painting operations.

(7) The paper backing with an adhesive layer at the edges thereof has the covering capacity of the full width of the paper but with minimum adhesion, permitting an economy in the adhesive coating, a ready removal from the body to which it is applied, avoiding the danger of marring the surface to which it is applied, may be unrolled or separated from an adjacent sheet with great facility and, in general, the paper backed adhesive tape widens the field of utility due to cheapening the cost of the entire article.

Having thus described my invention and illustrated its use, what I claim as new and desire to secure by Letters Patent, is—

1. The method of making an adhesive sheeted product which includes applying to a unified cellulosic backing, a priming coating and then overlying a normally pressure sensitive adhesive over said first coating.

2. The method of making a sheeted adhesive product which includes applying to a cellulosic backing comprising paper, a priming coating and then overlying a normally pressure sensitive adhesive coating over said first coating.

3. The method of making a sheeted adhesive product which includes unifying a cellulosic backing by a saturating solution, drying, applying a priming coating and then overlying a normally pressure sensitive adhesive over said first coating.

4. The method of making a sheeted adhesive product which includes unifying a cellulosic backing of unsized paper by impregnating the paper, drying the paper so treated and uniting a normally pressure sensitive adhesive coating thereto.

5. The method of making a sheeted adhesive product which includes unifying a cellulosic backing of unsized paper by impregnating the paper, drying the paper so treated, and uniting a normally pressure sensitive adhesive coating thereto, including interposing a priming coating between said adhesive coating and sheet so treated.

6. The method of making an adhesive sheeted product which includes applying to a unified cellulosic backing, a priming coat, overlying a normally pressure sensitive adhesive over said first coat, and applying a finishing coat on the face opposite to said adhesive coat.

7. The method of making an adhesive sheeted product which includes applying to a cellulosic backing, a finishing coat to unify the cellulosic backing, and then applying on one surface thereof, a unified pressure sensitive adhesive.

8. The method of making a sheeted adhesive product which includes applying to a cellulosic backing comprising paper, a priming coating, overlying a unified pressure sensitive adhesive and then coating the opposite face of said paper with a finishing coat, to unify the paper.

9. The method of making a sheeted adhesive product which includes applying to a cellulosic backing comprising unsized paper, a unifying impregnating composition for the fibres of said paper, coating one face of the paper so treated with a primer comprising plasticized rubber and overlying a normally pressure sensitive adhesive over said priming coat.

10. The method of making a sheeted adhesive product which includes applying to a cellulosic backing comprising unsized paper, a unifying impregnating composition for the fibres of said paper, coating one face of the paper so treated with a primer comprising plasticized rubber, overlying a normally pressure sensitive adhesive over said priming coat, and coating the opposite face with a finishing coating.

11. The method of making a sheeted adhesive product which comprises treating cellulosic backing comprising paper to unify the fibres thereof against lamination by impregnating the same with a unifying composition, drying the paper so treated, coating one surface thereof with a priming coat, overlying a pressure sensitive adhesive coating over the priming coat and then applying a back size to the opposite surface of the paper so treated.

In testimony whereof I have hereunto signed my name.

RICHARD GURLEY DREW.